US008577805B1

(12) United States Patent
Oakes, III et al.

(10) Patent No.: US 8,577,805 B1
(45) Date of Patent: Nov. 5, 2013

(54) SYSTEMS AND METHODS FOR VIRTUAL BANKING

(75) Inventors: Charles Lee Oakes, III, Boerne, TX (US); Rickey Dale Burks, Boerne, TX (US); Randy Ray Morlen, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 699 days.

(21) Appl. No.: 11/781,911

(22) Filed: Jul. 23, 2007

(51) Int. Cl.
  *G06Q 40/00* (2012.01)
(52) U.S. Cl.
  USPC ............................................. 705/45; 705/35
(58) Field of Classification Search
  USPC ........................................................ 705/45, 35
  See application file for complete search history.

(56) References Cited

U.S. PATENT DOCUMENTS

| | | | |
|---|---|---|---|
| 4,491,725 A | 1/1985 | Pritchard | 705/2 |
| 4,689,478 A | 8/1987 | Hale et al. | 235/380 |
| 4,739,295 A | 4/1988 | Hayashi et al. | 235/379 |
| 4,868,376 A | 9/1989 | Lessin et al. | 235/492 |
| 5,317,729 A * | 5/1994 | Mukherjee et al. | 1/1 |
| 5,521,362 A | 5/1996 | Powers | |
| 5,602,936 A * | 2/1997 | Green et al. | 382/140 |
| 5,825,506 A * | 10/1998 | Bednar et al. | 358/402 |
| 5,825,863 A | 10/1998 | Walker | |
| 6,119,229 A * | 9/2000 | Martinez et al. | 726/28 |
| 6,275,941 B1 * | 8/2001 | Saito et al. | 726/2 |
| 6,963,866 B2 * | 11/2005 | Schulze et al. | 1/1 |
| 7,068,832 B1 * | 6/2006 | Price et al. | 382/137 |
| 2002/0004783 A1 * | 1/2002 | Paltenghe et al. | 705/41 |
| 2002/0069170 A1 | 6/2002 | Rizzo et al. | |
| 2002/0145051 A1 | 10/2002 | Charrin | |
| 2005/0086168 A1 | 4/2005 | Alvarez et al. | |

OTHER PUBLICATIONS

PR_Newswire; "Key's Global Treasury Management Group to Feature Next-Generation Security and Service Technology at AFP Conference"; Oct. 5, 2005; Newswire; Supplier No. 137145170.*
Kirk, Bob; "Check 21 Bill Means Lockbox Systems Must Be Integrated"; American Banker; Aug. 6, 2004; ISSN: 0002-7561.*
Anonymous; "How community banks can benefit from Internet payment services and CRM technology"; Texas Banking; Aug. 2001; ISSN: 0885-6907.*
If You Lose All Your Data Today . . . Will You Still Be in Business Tomorrow?, http://www.usdatatrust.com/landing/online-backup. asp, U.S. Data Trust: Online Data Backup Services, 2006, 1 page.

(Continued)

*Primary Examiner* — Edward Chang
(74) *Attorney, Agent, or Firm* — Brooks, Cameron & Huebsch, PLLC

(57) ABSTRACT

Mechanisms for virtual banking are disclosed herein that provide experiences to users as if they were actually interacting with a branch office bank. For instance, virtual lockboxes are provided to users, and users can fill these lockboxes with the type of digital data that would traditionally be placed in a branch office bank lockbox. Birth certificates, social security numbers, wills, etc., can be uploaded from a user's remote computing device to a server associated with a bank. In another aspect, currency cards are disclosed that mimic cash withdrawal (or deposit) transactions users might engage in at typical branch offices. For example, users can download money from a bank server onto a currency card located at some remote location (or, alternatively, upload money from the card to the server, which would amount to a deposit being made to the bank).

18 Claims, 7 Drawing Sheets

(56) References Cited

OTHER PUBLICATIONS eOriginal SmartSign® on Demand, http://www.eoriginal.com/products/ss_ondemand.html, *eOriginal Products: SmartSign*, 2006, 1 page.

Information security for the extended enterprise, http://www.cyber-ark.com/datasecuritysoftware/index.asp?gclid=CMXUrsift4UCFTntJAodxCazzA, *Cyber-Ark*, 2006, 1 page.

Keeping your data safe . . . keeps you in business, http://www.centraldatavault.com/index.htm, *Central Data Vault, Online Backup Freed Trial, Computer Remote Backup*, 2006, 2 pages.

Electronic Safety Deposit Box, http://www.whynot.net/view_idea?id=1110, *Why N?t, Electronic Safety Deposit Box*, 2006, 2 pages.

* cited by examiner

SYSTEMS AND METHODS FOR VIRTUAL BANKING

CROSS REFERENCE TO RELATED APPLICATIONS

This application is related to the subject matter disclosed in the following commonly assigned applications: U.S. patent application Ser. No. 11/781,914 filed on Jul. 23, 2007, entitled "System and Methods For Virtual Banking."

This application is related to subject matter disclosed in the following commonly assigned application: U.S. patent application Ser. No. 11/450,673, filed Jun. 9, 2006, entitled "Systems and Methods for Multi-User Accessible Secure Online Repositories"; U.S. patent application Ser. No. 11/450,671, filed Jun. 9, 2006, entitled "Systems and Methods for Multi-User Accessible Secure Online Repositories"; U.S. patent application Ser. No. 11/450,675, filed Jun. 9, 2006, entitled "Systems and Methods for Electronic Delivery of Documents Using Secure Online Repositories"; U.S. patent application Ser. No. 11/450,691, filed Jun. 9, 2006, entitled "Systems and Methods for Electronic Delivery of Documents Using Secure Online Repositories"; U.S. patent application Ser. No. 11/450,674, filed Jun. 9, 2006, entitled "Systems and Methods for a Document Exchange Medium Using Secure Online Repositories"; U.S. patent application Ser. No. 11/450,428, filed Jun. 9, 2006, entitled "Systems and Methods for a Document Exchange Medium Using Secure Online Repositories".

BACKGROUND OF THE INVENTION

Traditional banking requires that users transact with branch offices of banks. Such transactions may require users to walk into the branch banks or at least use automatic teller machines (ATMs) outside such branch banks. Moreover, limited remote banking resources are available today, where users can check their account balance(s) or pay their bills online. However, what is needed is mechanisms for virtual banking that will provide an experience to users as if they were actually interacting with a branch office bank.

SUMMARY OF THE INVENTION

Mechanisms for virtual banking are disclosed herein that provide experiences to users as if they were actually interacting with a branch office bank. By way of example and not limitation, virtual lockboxes are provided to users, and users can fill these lockboxes with the type of digital data that would traditionally be placed in a branch office bank lockbox (e.g. a safety deposit box). For example, birth certificates, social security numbers, wills, etc. can be uploaded from a user's remote computing device to a server associated with a financial institution (e.g. a bank). Various protocols are used to ensure that interaction of the user with the virtual lockbox is secure and reflective of the experience users might have with a typical lockbox.

In another aspect of the presently disclosed subject matter, currency cards are used that mimic cash withdrawal (or deposit) transactions users might have at typical branch offices. Again, by way of example and not limitation, users can download money from a bank server onto a currency card located at some remote location (or, alternatively, upload money from the card to the server, which would amount to a deposit being made to the bank). This mechanism allows banks and users to seamlessly move funds around, allowing for a rich virtual banking experience.

It should be noted that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed or shown. The following figures are included.

DETAILED DESCRIPTION OF ILLUSTRATIVE EMBODIMENTS

Overview

Figure 1:
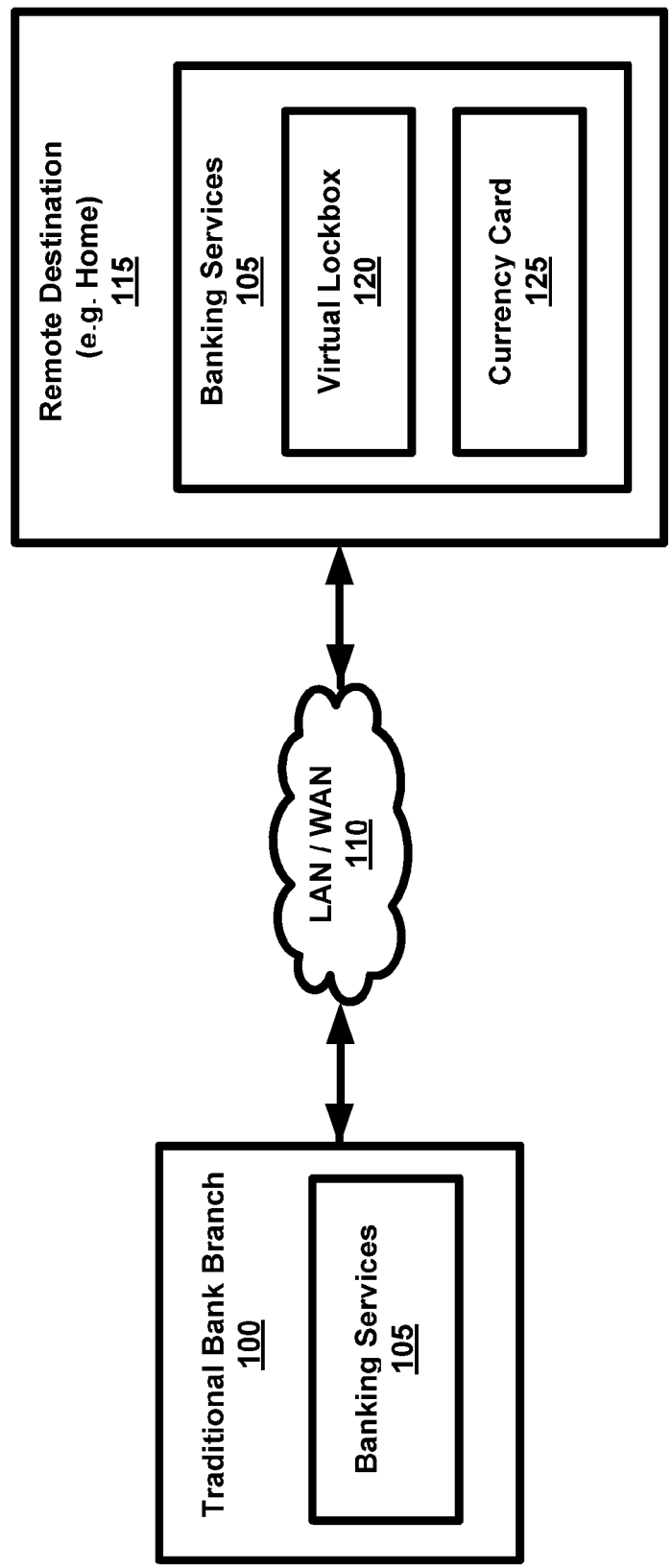
FIG. 1 illustrates a general architecture of various aspects of virtual banking, including virtual lockboxes and currency cards.
Figure 2:
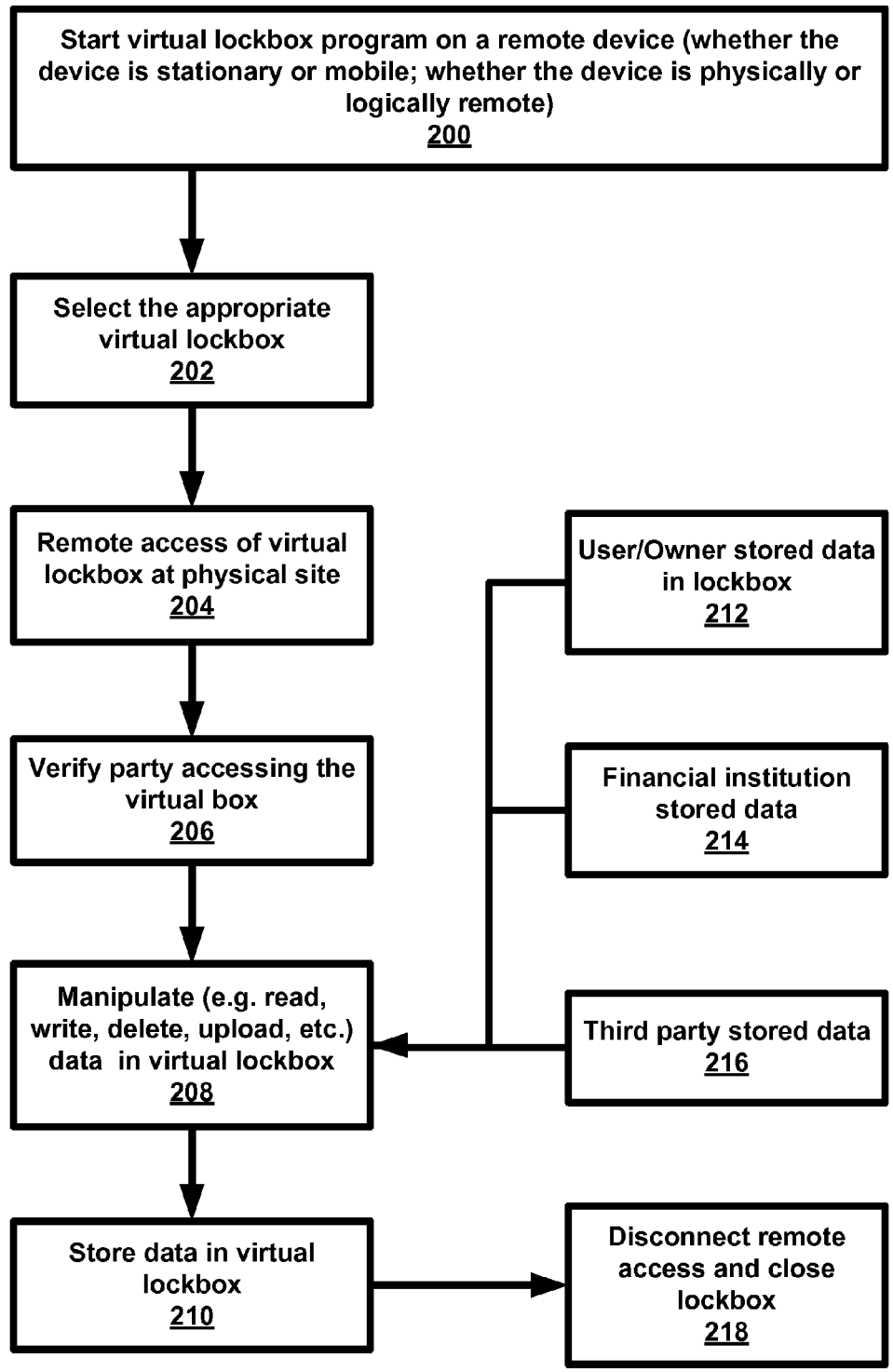
FIG. 2 provides a block diagram flow chart of how virtual lockboxes may be implemented and/or used.

As was mentioned above, mechanisms are disclosed herein for virtual banking, where these mechanisms provide experiences to users as if they were actually interacting with a branch office bank. FIG. 1 illustrates a general architecture of various aspects of virtual banking, including virtual lockboxes and currency cards. Thus, a traditional bank branch 100 may provide various banking services 105, including issuing currency in a withdrawal transaction or accepting currency in a deposit transaction. Such banks 100 also provide other services, such as safety deposit boxes, where bank members can cache valuable and/or important articles.

These services 105 can be also provided to remote users at remote destinations 115. For instance, virtual lockboxes 120 (which may correspond to, among other types of caching devices, to safety deposit boxes) can be exposed to users so that these users can deposit digital articles and safely store them. Such articles may include birth certificates, social security numbers, wills, and so on Users at the remote location 115 can upload these digital articles via some network 110 to servers at the traditional bank 100 (or any financial or non-financial institution maintaining servers).

In addition, the banking services 105 can also include currency cards. In short, users at remote locations can have currency cards which can download currency from the traditional banks 100 (withdrawal of funds) or upload currency to such banks 100 (deposit of funds). In either case, the currency cards can be used as traditional currency, but without having users to actually visit the banks 100 in person.

It should be noted that the subject matter of the disclosed aspects herein is provided with specificity to meet statutory requirements. However, the Detailed Description itself is not intended to limit the scope of this disclosure. Rather, the inventors have contemplated that the claimed subject matter might also be embodied in other ways, to include different steps or elements similar to the ones described herein, in conjunction with other present or future technologies. Moreover, the description herein of systems, for example, applies also to methods, computer readable media, apparatuses, and the like.

Virtual Lockboxes

In one aspect of the presently disclosed subject matter, a system provides a virtual lockbox where users can store information (e.g. data), just as they might store in a typical physical lockbox or safety deposit box. As is shown at block 200, a first subsystem of this system can be configured to allow users to start a virtual lockbox program on a device remote from a financial institution. In one exemplary and non-limiting aspect, the financial institution, such as a bank, can have a server computing device and the server can communicate with the remote device, which can be a client computing device. Users can thus place all kinds of digital information on the server (via the client) that they would typically put in a safety deposit box. For example, they could deposit scanned in birth certificates, social security numbers, wills, and so on.

The lockbox program can be running on the remote device and it can be communicating with the financial institution server. One way in which it may do so is by installing an applet or some thin software component on the server. Alternatively, the financial institution can install an applet or some thin component on the client, so that the client can communicate with the server. The lockbox program itself provides a user friendly interface so that user can interact with the virtual lockbox just as they might with the actual physical lockbox. In fact, the former lockbox might to some extent track or reflect the contents stored in the latter lockbox.

Thus, for example, if the physical lockbox has a stored birth certificate, this certificate can be scanned in by the financial institution and a digital copy thereof may be placed in the virtual lockbox. Alternatively, users themselves may scan in the paper copy of the birth certificate and place the digital copy in the lockbox. Moreover, the financial institution may then take this digital birth certificate, copy it (if it has permission by the user to do so), and store it in the physical lockbox. In short, the relationship between the physical lockbox and the virtual lockbox is two-way: the former can have contents that reflect the latter and vice-versa.

The lockbox program can provide users with an experience as though they are depositing contents in a safety deposit box at a regular bank branch. Thus, three dimensional graphics can be displayed, and a depositing (and/or withdrawing) program can run so that users can leverage their experience in interacting with physical lockboxes and translate that experience to the digital world.

When users want to interact with the virtual lockbox, another subsystem (in some aspects associated with or a part of the program) can be configured to provide users with a selection menu of various different lockboxes, as is shown at block 202. For example, a first lockbox can be used to deposit birth certificates at a first bank, and a second lockbox can be used to withdraw a will from an attorney's office (if, for instance, such an attorney has stored the will digitally and is hosting the will via some server; or, if the user stored the will digitally in the first place). Thus, plurality of such lockboxes can be used by the users, and these lockboxes can be associated with various different institutions (whether financial or not).

In order to allow for the communication between servers and clients, at block 204, another subsystem can be configured to remotely access the virtual lockbox. As will be explained in more detail below, the virtual box itself can be a digital storage medium and it can be located at the financial institution or at the client, depending on the specific implementation. In either case, this subsystem access the virtual lockbox, whether via some internal bus, local area network (LAN), or a wide area network (WAN)—or some combination thereof—and establishes a connection between the virtual lockbox and the virtual lockbox program.

Next, still another subsystem, at block 206 can be configured to monitor the above mentioned access via some kind of verification. This verification may be a user identification, a password, a credit card number, a digital certificate, and the like. In some exemplary aspects, the verification can also require input from users and the financial institution. Thus, in this respect it can function like a safety deposit box in a typical bank. The user may have one "key," such as a user identification and a password, while the financial institution may have another "key," such as a digital certificate. Both of these keys may be required to unlock the virtual lockbox. However, in other aspects, only one "key" may be used, depending on the security level of the lockbox. Moreover, the level of such security may be established by the financial institution, the user, some third party, or a combination thereof—depending on the implementation.

In other aspects, verification can be based on biometric data. For example, voice recognition results, finger scans, iris scans, DNA scans, and so on may be used to verify users who want to access the lockbox. And, in still other aspects, a combination of biometric and non-biometric security measures (discussed above) can be employed. The type of security measure each users has to provide may depend on the individual in question (and perhaps the location from where such an individual is trying to access the lockbox). Moreover, the type of verification to be employed may depend on the type of data users are trying to access. For instance, to obtain the social security number from a lockbox, users may only have to provide a user identification and password; but, to obtain more sensitive data, such as a will or medical evaluation data, users may have to provide biometric data, such as voice recognition, and so on.

In any event, once the verification has been established, at block 208, another subsystem can be configured to allow users to manipulate data in the unlocked virtual lockbox via some operation. Users may manipulate data in the sense that they may use a read operation, a write operation, a delete operation, and so on. However, not only users may do this, however, since the financial institution may be given permission to manipulate data, as well as trusted third parties, such as family members, doctors, attorneys, psychiatrists, brokerage houses, and so on.

Data may be manipulated in numerous ways by numerous parties that have the requisite verification information to unlock a virtual lockbox. For instance, a doctor may place a digitized medical evaluation in the lockbox, but such a doctor may not be given permission to scrutinize other content (such as, perhaps, competing evaluations from other doctors). By way of another example, insurance companies may be allowed to read a limited portion of data from the lockbox (e.g. social security number information, past employment history, etc.) but may be prevented from reading other data, such as the digitized medical evaluation provided by the doctor. Thus, blocks 212, 214, 216 show that various parties may manipulate the lockbox data, based on various access privileges.

Once data has been manipulated, at block 210, a subsystem can be configured to store the data after operation. The data can be stored at the physical location of the financial institution or it may be stored by some third party storage service provider. In other aspects, the data associated with the lockbox can even be stored at the client device. In this case, a partition or virtual machine in memory can be dedicated to storing of lockbox data, thereby allowing all other data (i.e. including code) to be stored in other partitions of the client memory. Storage, as those of skill in the art will appreciate, can be either central or it can be distributed over various devices. For instance, for security reasons it may be more prudent to separate data out over various corners of a network (i.e. WAN/LAN) so that all data associated with the lockbox will not be compromised. After data storage (or in some aspects even before storage), at block 218, the access to the lockbox can be terminated.

The aforementioned client and server devices may be either stationary or mobile. In the former case, a client desktop can interact with a server, while in the latter scenario a cell phone can interact with the server located at the institution. The client device can therefore be physically remote from the institution and/or it may be logically remote from the financial institution (even if not physically remote, say, in the case of users going to the physical bank and using desktops to access virtual lockboxes maintained by servers in that bank).

Figure 3:
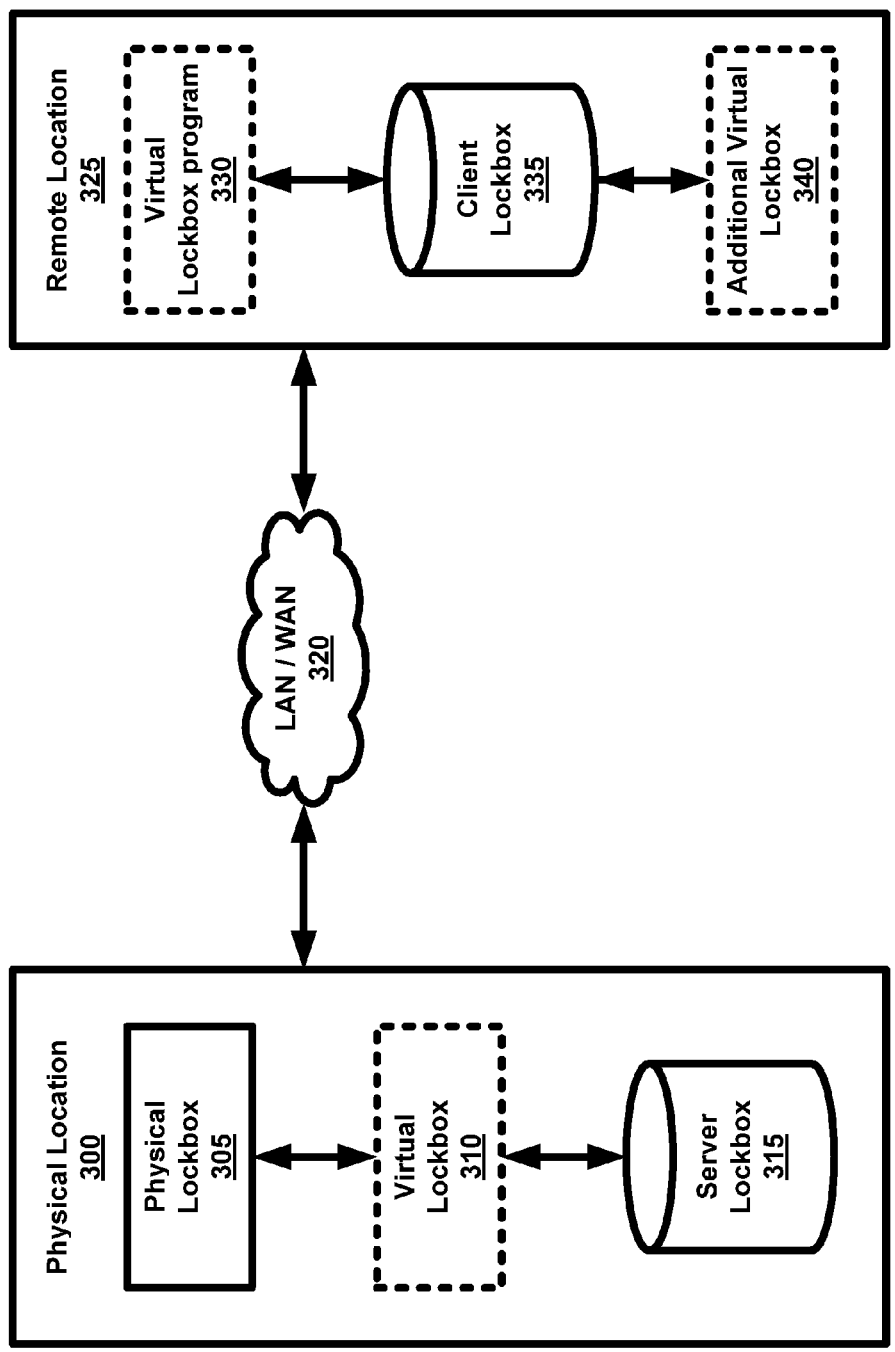
FIG. 3 illustrates a system that provides virtual lockboxes where users can store information (e.g. data), just as they might store in a typical physical lockbox or safety deposit box.

Turning now to FIG. 3, it provides a general overview of a virtual lockbox mechanism. A physical location 300 and a remote location 325 are shown. They may contain devices that can communicate via a network, such as a LAN or a WAN 320. A user using a remote device, such as a desktop, laptop, or a cell phone, running a virtual lockbox program thereon, can access the virtual lockbox 310 at the physical location 300. The virtual lockbox 310 may be implemented on a server 315 with various type of data storing schemes, such as files, databases, and so on. Using the program 330, the user can manipulate data in the virtual lockbox 310. It should be noted that the goal of the virtual lockbox 310 is to emulate a physical lockbox 305.

FIG. 3 also shows that additional virtual lockboxes 340 can be used, and they may be stored locally to the virtual program 330 (or they may be stored at locations different from the physical location 300 and the remote location 325). In any event, if a virtual lockbox 340 is local, it can have its own client server lockbox 335. Yet, in other aspects, a virtual lockbox software component may be running in physically or logically remote location from the hardware storage medium (whether random access memory (RAM), read only memory (ROM), and so on).

Digital Currency Cards

In another aspect of the presently disclosed subject matter, a system is disclosed for remotely transacting currency with users of financial institution digital currency cards. Of course, such digital currency cards refer to any cards that could aid such users in engaging in fiscal transactions, including credit cards, debit cards, and so on. Such cards could even function as medical cards, where users could pay for their services with such cards and use these cards also for providing medical information to health care personnel.

Figure 4:
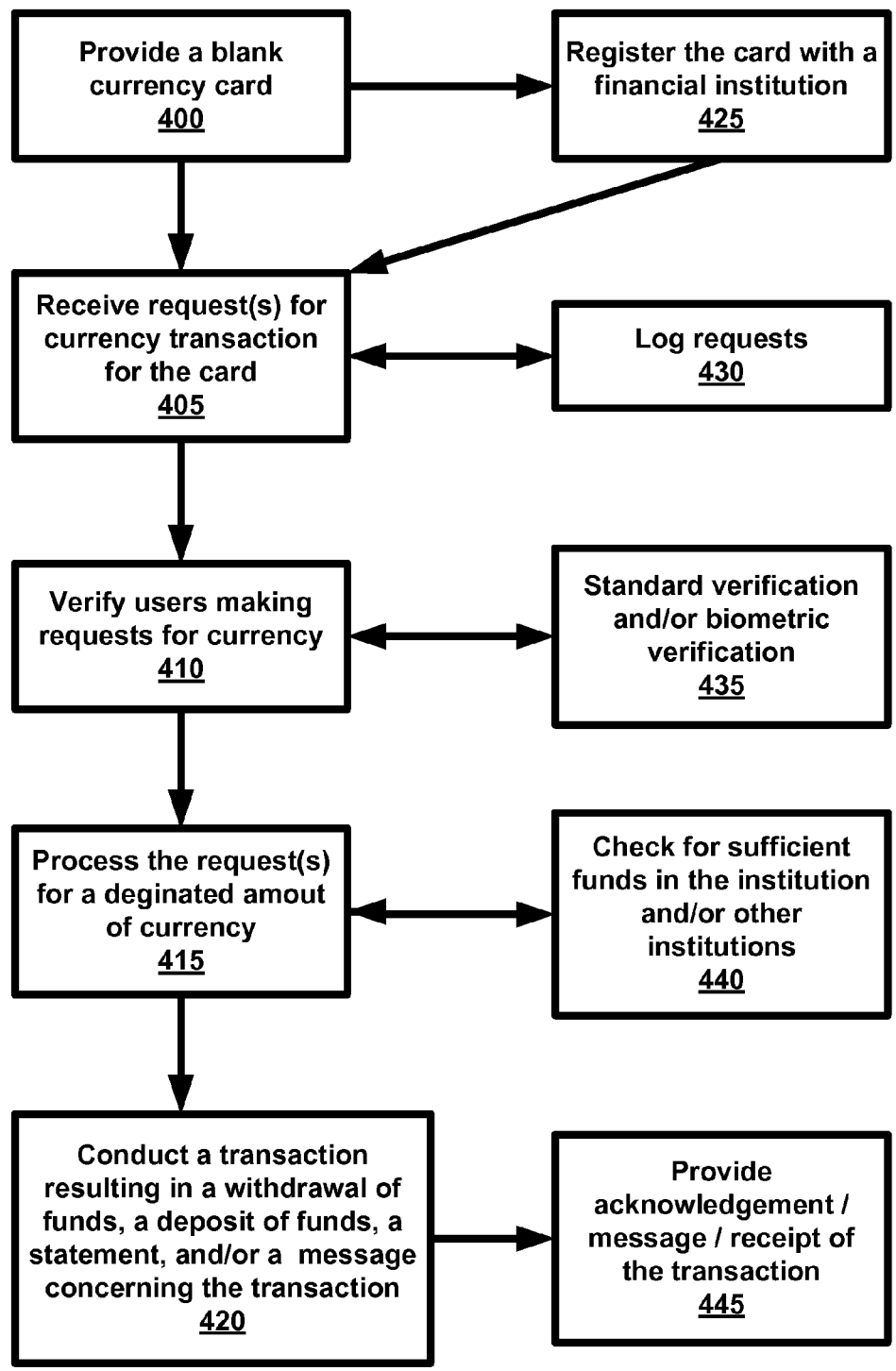
FIG. 4 provides a block diagram flow chart of how currency cards may be implemented and/or used.

Thus, FIG. 4 provides an exemplary and non-limiting flowchart in block diagram form that shows how a currency card could transact with a financial institution to either deposit currency on such a card or withdraw currency from such a card. At block 400, a currency card is provided to users of such cards. Such cards could either be pre-registered for users (with their name information, date of validity of the cards, etc.), or such cards could be blank in the sense that only the essential card identification information is stored on such card.

In one aspect, the card could be registered with some financial institution(s) so that any processing time downstream, that is, once users are actually using the cards, is decreased. In other words, if users register the cards before use thereof, providing their name, address, social security number, and the like, they won't have to do this once a transaction occurs.

But, in other aspects, users don't have to pre-register the card, and can instead use the card as an anonymous substitute for money. For instance, users can receive pre-loaded amounts of money on the card and use this amount to conduct financial transactions. However, in the case where they may want to add money on their card from available funds at their bank, they could do so by providing the proper account information and associated security information (PIN number, password, etc.) to their bank.

In this latter scenario, at block 405, a subsystem can receive a remote request from a user to withdraw currency from a currency card and/or deposit currency on the currency card. The currency card may function like real hard currency that the user is withdrawing from a bank and/or depositing to a bank. Thus, it can act like a wallet with currency, where such currency can be used at various point of sale terminals, and with various merchants. The digital currency, then, is universal currency (akin to physical currency). As block 430 indicates, such requests can be logged to keep track of the number of requests, by the requesting users, and the times such requests were made.

Once the request is received, at block 410, another subsystem can verify that the user making the request is authorized to withdraw or deposit a designated amount of currency (where the verification can be performed against a database at a financial institution). Furthermore, as block 435 indicates, such a verification can be a standard verification and/or a biometric verification. As was already explained above in the context of virtual lockboxes, in the former case it can be a user identification, password, digital certificate, and the like, while in the latter case it can be biometric verification, taking into account a user's voice, iris, fingerprint, DNA, etc. signature.

Upon verification, the original request submitted by users is processed for some designated amount of money, as shown at block 415. In the case where users ask for currency to be placed on their cards, a check is made that sufficient funds are available. If sufficient funds are not available, in one exemplary aspect, a subsystem can check funds availability at an institution other than the financial institution which the user contacted for funds. In other words, if a user is member to two banks, and the bank originally contacted tells the user that there are insufficient funds to put on the card, if the user has authorized this bank to access funds at another bank, the former bank can do so and then place these funds on the card.

Once this processing is complete, the currency can be placed on the card (or, in other scenarios, withdrawn from the card), as shown at block 420. It may be transferred from a financial institution to the card using typically secure transfer mechanisms, such as secure hypertext transfer protocol (HTTPS) and the like. As an additional convenience and/or security measure, as block 445 indicates, an acknowledgment can be provided after the transaction has completed. It is understood that the acknowledgement can be made by the currency card if currency is received and stored on the currency card, and alternatively, by a financial institution if currency is withdrawn from the currency card and received by said financial institution. In addition to the acknowledgement, as block 445 shows, a subsystem can also provide a digital statement of the transaction and/or a message concerning the transaction (e.g. advertisements related to the transaction).

Figure 5:
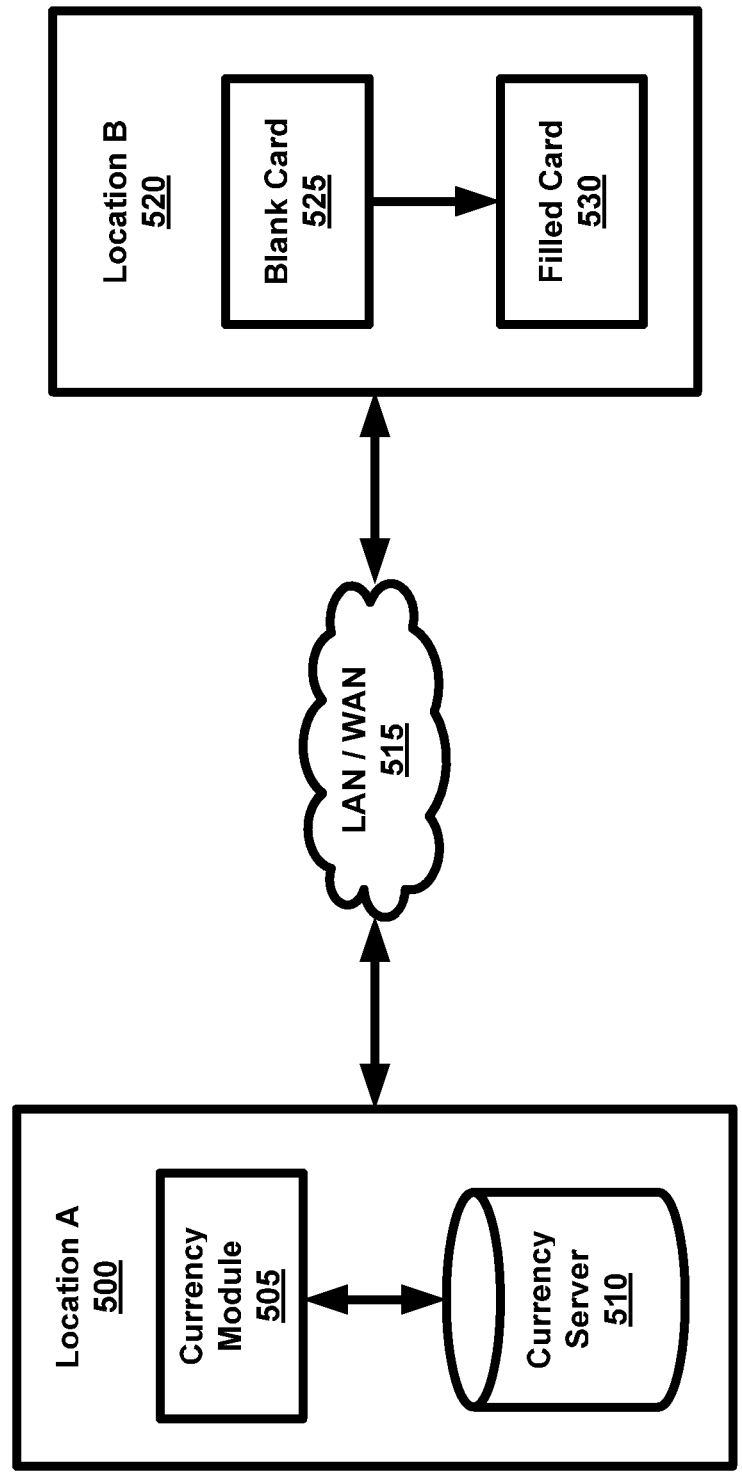
FIG. 5 illustrates a currency card system with cards transacting with remote locations to withdraw and/or deposit funds.

FIG. 5 summaries how one typical and non-limiting aspect of the presently disclosed subject matter might function. A user at location B 520, having a blank card 525, can contact some institution at different location A 500, via some network 515, in order to deposit money on the blank card 525 (in other scenarios, as discussed above, money can be withdrawn from the card, if it is not blank and has sufficient funds). Upon a request from such a user, a currency transaction module 505 can check the appropriate databases whether the user is authorized to transfer funds and if such funds are available for transfer. If all checks and verification are fulfilled, digital currency can be transferred from location A 500 (such as a bank) to location B 520 (such as a user's card).

It should be noted that the term "currency card" is not limited to the physical dimensions of a typical credit card. Rather, it may refer to software installed on a computer, a cell phone, a PDA, and the like, or it may refer to hardware or firmware. In a standard aspect, the card may resemble a traditional debit card with a magnetic strip, but it is certainly not limited to such a device. As software, for example, a currency card could be embodied in a computer readable medium, as stored instructions thereon executable by any computing device.

Exemplary Computing and Networking Environment

Figure 6:
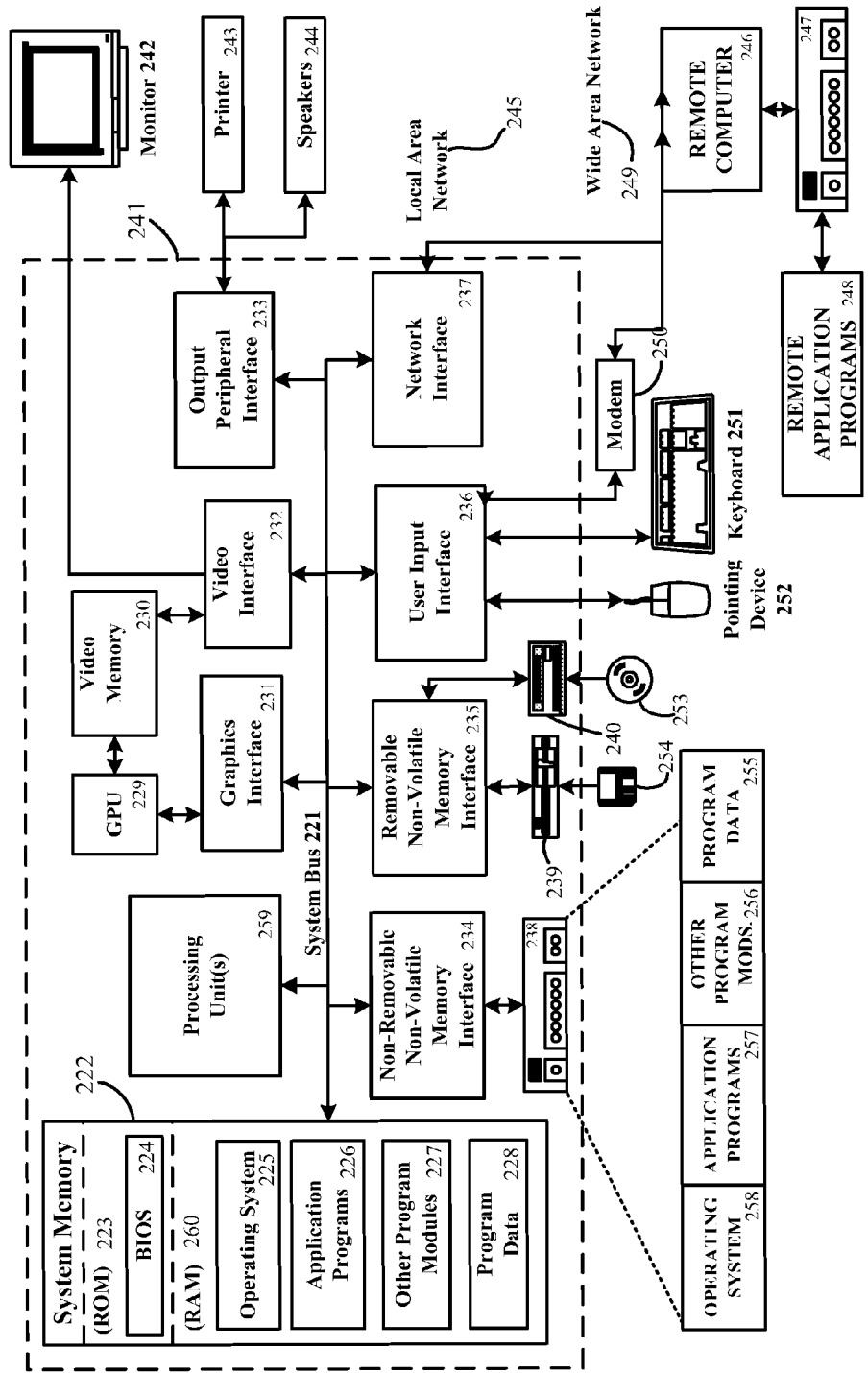
FIG. 6 illustrates exemplary and non-limiting computing devices (and components thereof) that can be used with the aspects disclosed herein.

Referring to FIG. 6, shown is a block diagram representing an exemplary computing device suitable for use in conjunction with implementing the systems, methods, and computer readable media described above. For example, computer executable instructions that carry out the processes and methods for virtual lockboxes and digital currency cards are provided. They may reside and/or be executed in such a computing environment as shown in FIG. 6. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220.

Aspects of the presently disclosed subject matter are operational with numerous other general purpose or special purpose computing system environments or configurations. Examples of well known computing systems, environments, and/or configurations that may be suitable for use with the this subject matter include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the presently disclosed subject matter may be implemented in the general context of computer-executable instructions, such as program modules, being executed by a computer. Generally, program modules include routines, programs, objects, components, data structures, etc. that perform particular tasks or implement particular abstract data types. Aspects of the presently disclosed subject matter may also be practiced in distributed computing environments where tasks are performed by remote processing devices that are linked through a communications network. In a distributed computing environment, program modules may be located in both local and remote computer storage media including memory storage devices.

An exemplary system for implementing aspects of the presently disclosed subject matter includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and includes both volatile and nonvolatile media, removable and non-removable media. By way of example and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during startup, is typically stored in ROM 223. RAM 260 typically contains data and/or program modules that are immediately accessible to and/or presently being operated on by processing unit 259. By way of example, and not limitation, FIG. 6 illustrates operating system 225, application programs 226, other program modules 227, and program data 228.

The computer 241 may also include other removable/non-removable, volatile/nonvolatile computer storage media. By way of example only, FIG. 6 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 6, provide storage of computer readable instructions, data structures, program modules and other data for the computer 241. In FIG. 6, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 65. The logical connections depicted in FIG. 6 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example and not limitation, FIG. 6 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the said subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

In light of the diverse computing environments that may be built according to the general framework provided in FIG. 6, the systems and methods provided herein cannot be construed as limited in any way to a particular computing architecture. Instead, the presently disclosed subject matter should not be limited to any single embodiment, but rather should be construed in breadth and scope in accordance with the appended claims.

Figure 7:
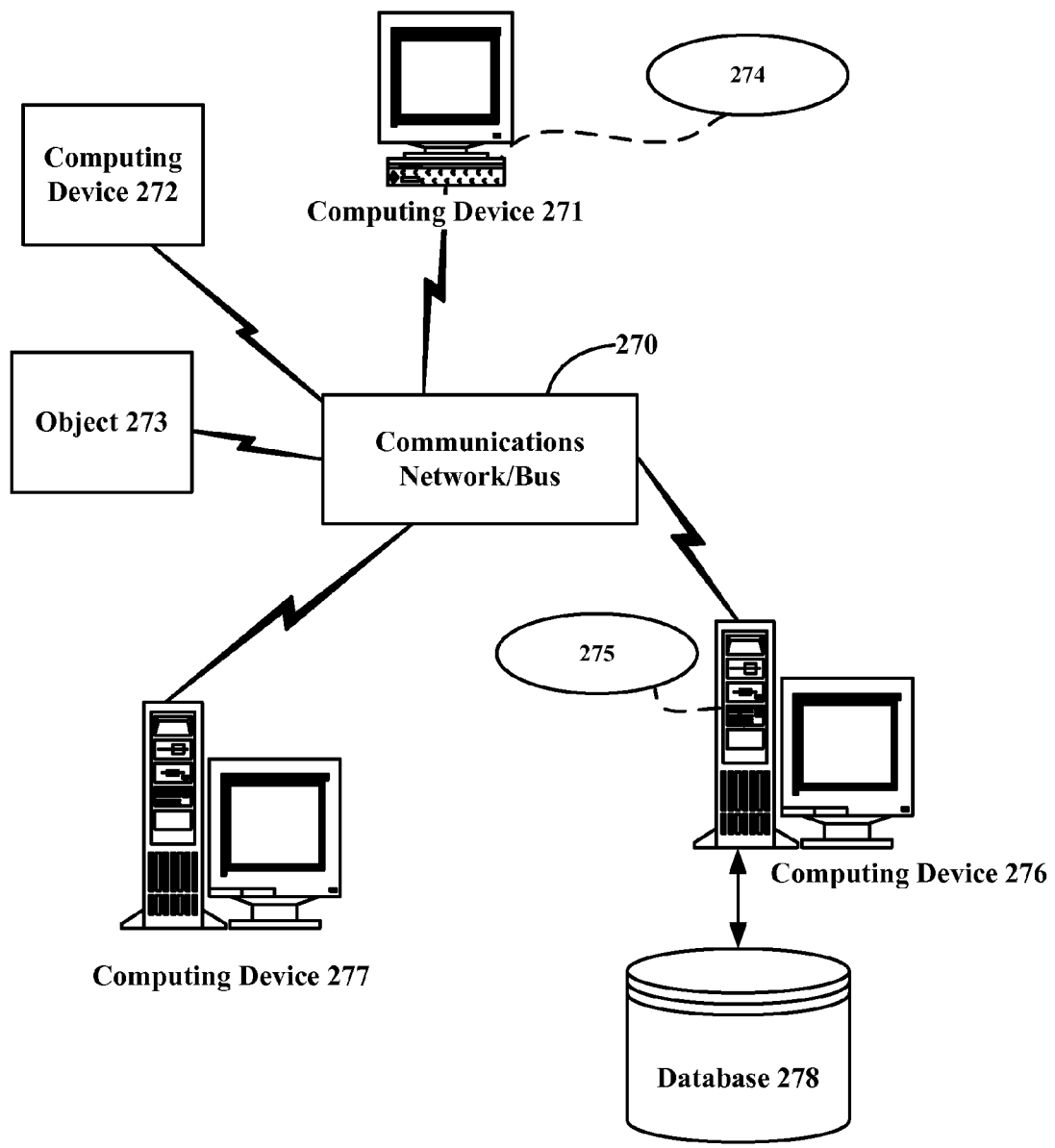
FIG. 7 illustrates exemplary and non-limiting networking devices (and components thereof) that can be used with the aspects disclosed herein.

Referring next to FIG. 7, shown is an exemplary networked computing environment in which many computerized processes may be implemented to perform the processes described above. For example, parallel computing may be part of such a networked environment with various clients on the network of FIG. 7 using and/or implementing the defining and extracting of a flat list of search properties from a rich structured type. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 7 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 7, and may itself represent multiple interconnected networks. In accordance with an aspect of the presently disclosed subject matter, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 7, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 7 and the further diversification that can occur in computing in a network environment such as that of FIG. 7, the systems, methods and computer readable media provided herein cannot be construed as limited in any way to a particular computing architecture or operating system. Instead, the presently disclosed subject matter should not be limited to any single embodiment, but rather should be construed in breadth and scope in accordance with the appended claims.

Lastly, while the present disclosure has been described in connection with the preferred aspects, as illustrated in the various figures, it is understood that other similar aspects may be used or modifications and additions may be made to the described aspects for performing the same function of the present disclosure without deviating therefrom. For example, in various aspects of the disclosure, processes and methods were described at least for virtual banking. However, other equivalent mechanisms to these described aspects are also contemplated by the teachings herein. Therefore, the present disclosure should not be limited to any single aspect, but rather construed in breadth and scope in accordance with the appended claims.

Thus, it should also be noted that any systems and subsystems disclosed or recited herein can be instantiated as various devices discussed herein. By way of example and not limitation, a system for providing banking from remote locations can employ any computing devices discussed with respect to FIGS. 6 and 7. A subsystem configured to allow at least one user to start a virtual lockbox program on a device remote from an institution can be any software, hardware, or firmware program or device; a subsystem in association with the virtual lockbox program, configured to provide at least one user with at least one selection of at least one virtual lockbox from a plurality of virtual lockboxes corresponding to at least one physical lockbox storage medium at said financial institution, can also be any such program or device. The same holds true for any systems or subsystems configured to remotely access at least one lockbox storage medium, those configured to receive at least one verification message, wherein at least one verification message requires input from a user, in conjunction with input from said institution, and those configured to allow at least one user to manipulate data in said at least one physical lockbox storage medium via at least one operation on at least one virtual lockbox. Similarly, a system for remotely transacting currency with users of financial institution digital currency cards can be implemented in such software, hardware, or firmware media.

What is claimed:

1. A system comprising a processing resource in communication with a non-transitory computer readable medium having instructions executed by the processing resource to:
   allow at least one user to start a virtual lockbox program on a device remote from an institution, wherein the virtual lockbox program stores a virtual content in a virtual lockbox, and wherein the virtual content of the virtual lockbox tracks a physical content of a safety deposit box at the institution;
   provide said at least one user with at least one selection of at least one virtual lockbox from a plurality of virtual lockboxes;
   remotely access said at least one lockbox storage medium;
   receive at least one verification message, wherein said at least one verification message requires input from said user, in conjunction with input from said institution in order to allow said at least one user to access the at least one virtual lockbox;
   receive a first verification in order to allow said at least one user to access a first piece of data from the virtual lockbox;
   receive a second verification in order to allow said at least one user to access a second piece of data from the virtual lockbox, wherein the second verification is different than the first verification and the second piece of data is different from the first piece of data;
   allow said at least one user to manipulate all data in said at least one physical lockbox storage medium via at least one operation on said at least one virtual lockbox; and
   allow a third party to manipulate only a portion of the data in said at least one physical lockbox storage medium via at least one operation on said at least one virtual lockbox.

2. The system according to claim 1, wherein said at least one user is either an owner of said at least one virtual lockbox or a third party to said owner and said institution.

3. The system according to claim 1, wherein said device is one of (a) a stationary device and (b) a mobile device.

4. The system according to claim 1, wherein said at least one verification is based on biometric data.

5. The system according to claim 1, further comprising instructions executable to allow said at least one user to select at least one virtual lockbox associated with an institution other than said institution.

6. The system according to claim 1, further comprising instructions executable to store at a site remote from said institution said data after said at least one operation.

7. A method for providing banking from remote locations, comprising:
   allowing at least one user to start a virtual lockbox program on a device remote from an institution, wherein the virtual lockbox program stores a virtual content in a virtual lockbox, and wherein the virtual content of the virtual lockbox tracks a physical content of a safety deposit box at the institution;
   interfacing with a scanner to submit digital data from the at least one user to the institution;
   providing said at least one user with at least one selection of at least one virtual lockbox from a plurality of virtual lockboxes;
   accessing remotely said at least one lockbox storage medium;
   receiving at least one verification message at a computerized system, wherein said at least one verification message requires input from said user, in conjunction with input from said institution in order to allow said at least one user to access the at least one virtual lockbox;
   receiving a first verification in order to allow said at least one user to access a first piece of data from the virtual lockbox;
   receiving a second verification in order to allow said at least one user to access a second piece of data from the virtual lockbox, wherein the second verification is different than the first verification and the second piece of data is different from the first piece of data;
   allowing said at least one user to manipulate all data in said at least one physical lockbox storage medium via at least one operation on said at least one virtual lockbox; and
   allowing a third party to manipulate only a portion of the data in said at least one physical lockbox storage medium via at least one operation on said at least one virtual lockbox.

8. The method according to claim 7, further comprising allowing access to said physical virtual lockbox to either an owner of said at least one virtual lockbox or a third party to said owner and said financial institution.

9. The method according to claim 7, further comprising communicating said device as one of (a) a stationary device and (b) a mobile device.

10. The method according to claim 7, further comprising using said verification that is based on biometric data.

11. The method according to claim 7, further comprising allowing said at least one user to select at least one virtual lockbox associated with an institution other than said institution.

12. The method according to claim 7, further comprising storing at a site remote from said institution said data after said at least one operation.

13. A non-transitory computer readable storage medium comprising instructions stored thereon that are executed by a processor to:
   allow at least one user to start a virtual lockbox program on a device remote from an institution, wherein the virtual lockbox program stores a virtual content in a virtual lockbox, and wherein the virtual content of the virtual lockbox tracks a physical content of a safety deposit box at the institution;
   provide at least one user with at least one selection of at least one virtual lockbox from a plurality of virtual lockboxes corresponding to at least one physical lockbox storage medium at said institution;
   remotely access said at least one lockbox storage medium;
   interface with a scanner to submit digital data from the at least one user to the institution;
   receive at least one verification message, wherein said at least one verification message requires input from said user, in conjunction with input from said institution in order to allow said at least one user to access the at least one virtual lockbox;
   receive a first verification in order to allow said at least one user to access a first piece of data from the virtual lockbox;
   receive a second verification in order to allow said at least one user to access a second piece of data from the virtual lockbox, wherein the second verification is different than the first verification and the second piece of data is different from the first piece of data;

allow said at least one user to manipulate all data in said at least one physical lockbox storage medium via at least one operation on said at least one virtual lockbox; and allow a third party to manipulate only a portion of the data in said at least one physical lockbox storage medium via at least one operation on said at least one virtual lockbox.

14. A non-transitory computer readable storage medium according to claim 13, further comprising at least one instruction that allows access to said physical virtual lockbox to either an owner of said at least one virtual lockbox or a third party to said owner and said financial institution.

15. A non-transitory computer readable storage medium according to claim 13, further comprising at least one instruction that communicate said device as one of (a) a stationary device and (b) a mobile device.

16. A non-transitory computer readable storage medium according to claim 13, further comprising at least one instruction that uses said verification that is based on biometric data.

17. A non-transitory computer readable storage medium according to claim 13, further comprising at least one instruction that allows said at least one user to select at least one virtual lockbox associated with an institution other than said institution.

18. A non-transitory computer readable storage medium according to claim 13, farther comprising at least one instruction that stores said data after said at least one operation at a site remote from said institution.

\* \* \* \* \*